Figure 1:
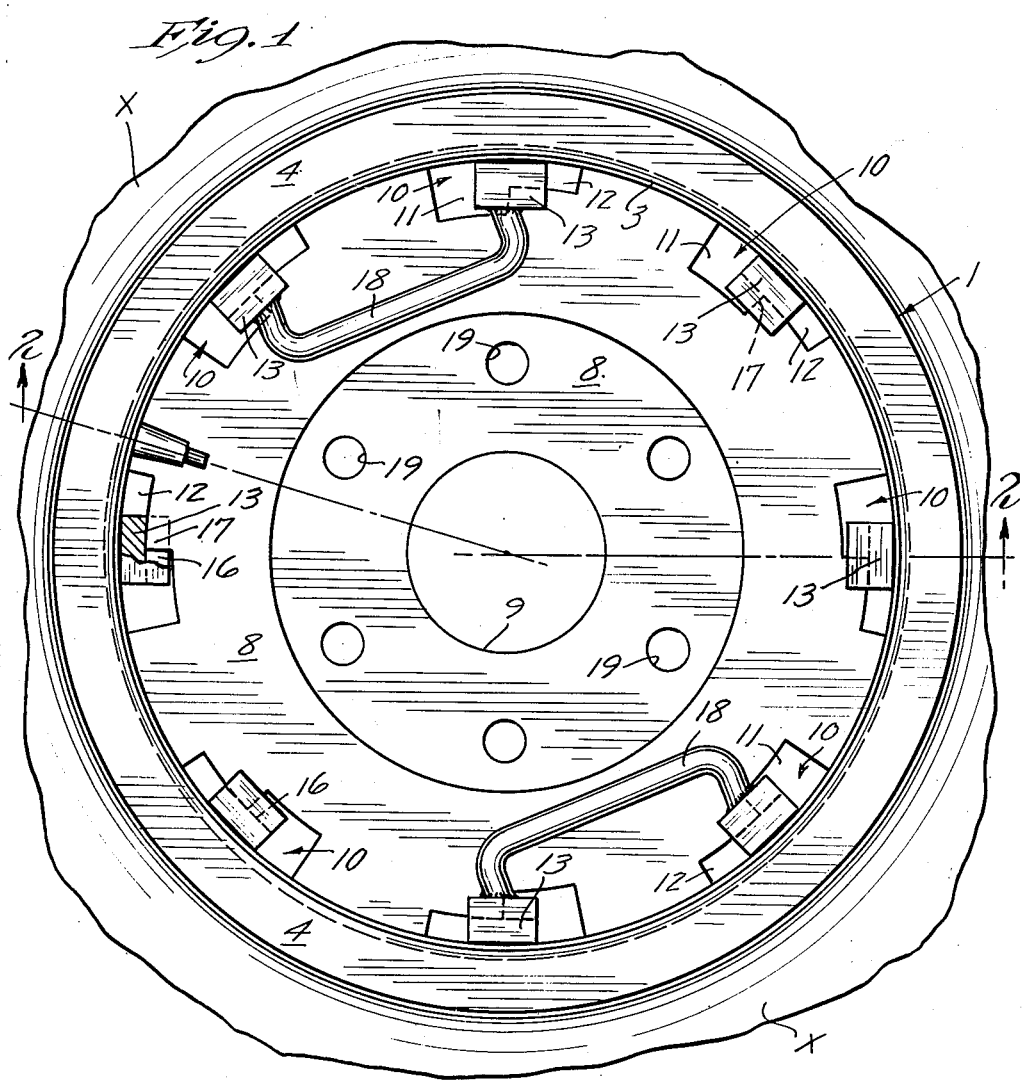

Aug. 7, 1956  E. W. HAWKINSON  2,757,702
RIM FOR PNEUMATIC TIRE CASINGS
Filed Oct. 23, 1953  2 Sheets-Sheet 1

INVENTOR.
Earle W. Hawkinson
BY
Merchant & Merchant
ATTORNEYS

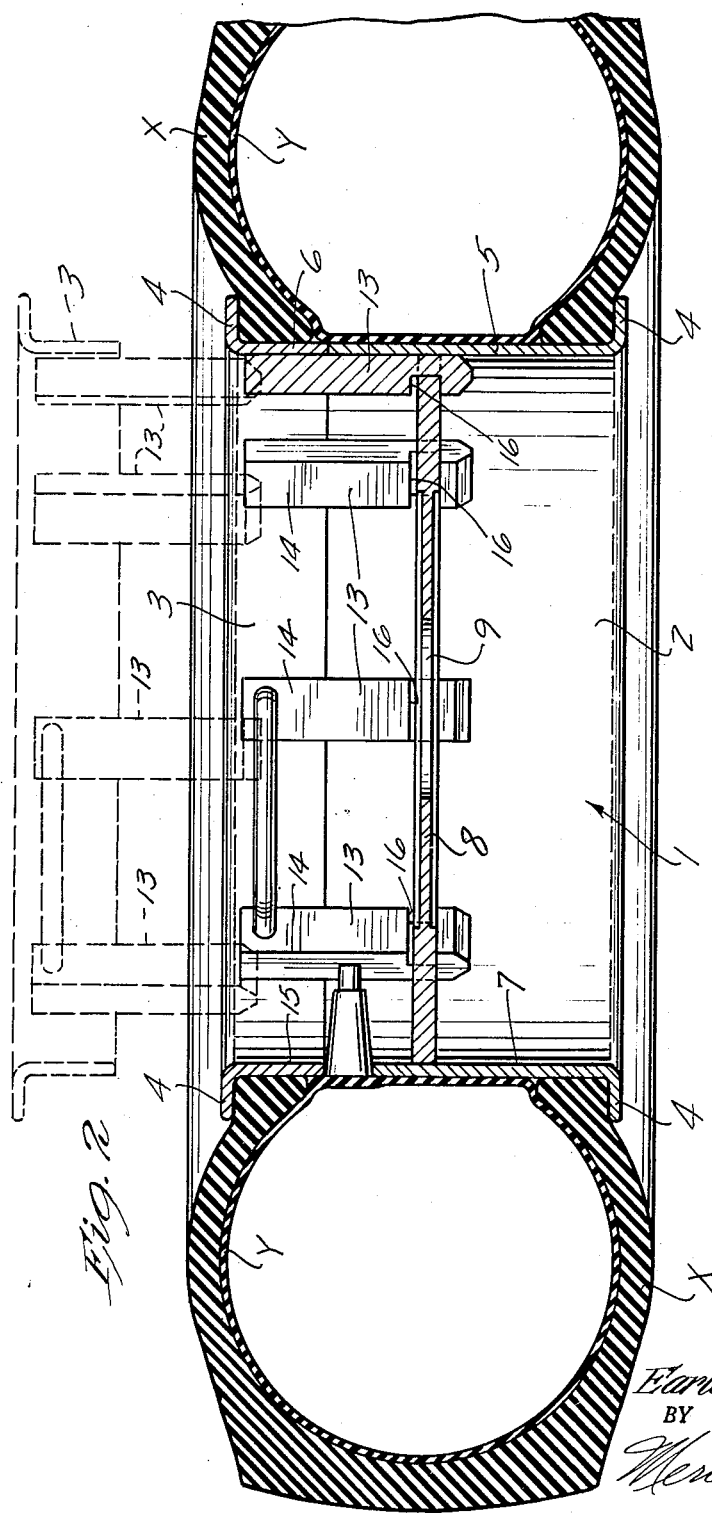

United States Patent Office 2,757,702
Patented Aug. 7, 1956

2,757,702

RIM FOR PNEUMATIC TIRE CASINGS

Earle W. Hawkinson, Minneapolis, Minn., assignor to Paul E. Hawkinson Company, Minneapolis, Minn., a corporation of Minnesota Application October 23, 1953, Serial No. 387,919

1 Claim. (Cl. 152—413)

My invention relates to improvements in rims for pneumatic tire casings, and more particularly for rims which are used as annular rotary work-supporting means for pneumatic tire casings during buffing and truing of the tread portions on lathe-type precision machines or in vulcanizing, retreading or repairing such pneumatic tire casings.

The primary object of my invention is the provision of a device of the class above described which is made up of cooperating rim sections, and upon which it is relatively easy to mount and dismount a pneumatic tire casing.

A further object of my invention is the provision of a device of the class described which has a minimum of working parts, which is simple in construction and is durable in use.

The above and still further objects of my invention will become apparent from the following detailed specification, appended claim and attached drawings.

Referring to the drawings wherein like characters indicate like parts through several views:

Fig. 1 is a view in side elevation of my novel rim structure having a pneumatic tire mounted thereon, some parts being broken away and some parts shown in section; and Fig. 2 is a sectional view taken substantially on the line 2—2 of Fig. 1, the dotted lines illustrating one of the rim sections removed.

Referring with greater particularity to the drawings the numeral 1 indicates in its entirety a rim comprising a pair of cooperating rim sections 2 and 3, each of which is provided at its outer edge with an upstanding, generally radially outwardly projecting annular bead-engaging flange 4. Each of the sections 2 and 3 also includes cooperating cylindrical portions 5 and 6 respectively. As shown, the axial width of the rim section 3 is considerably less than that of the rim section 2. Rim section 2 has rigidly secured to its radial inner surface 7 an annular plate-like disc 8, the central opening of which is identified by the numeral 9. As shown in Fig. 2, the disc 8 is normal to the axis of the rim sections 2 and 3 and is spaced midway between the flanges 4 thereof when said sections 2 and 3 are in their cooperating rim-forming positions. Also as shown, disc 8 is provided, immediately adjacent the radial inner surface 7 of rim section 2, with a plurality of circumferentially, equi-distantly spaced openings 10, identified in their entirety by the numbers 10, and including enlarged portions 11 and reduced portions 12.

Rim section 3 is provided with a plurality of axially projecting locking fingers 13 which have their axial outer ends 14 secured to the radial inner surface 15 of the rim section 3. Locking fingers 13 are circumferentially spaced equi-distantly to the openings 10 and are adapted to be received, one each within the enlarged end portions 11 of said openings 10 when the sections 2 and 3 are in their cooperating rim-forming positions, as shown by the full lines in Fig. 2. The locking fingers 13, adjacent their axial inner free ends, are provided with aligned grooves 16 which face the axis of said rim sections 2 and 3 and are adapted to receive therein, as shown in Fig. 1, the shoulder-like locking lugs 17 of the plate-like disc 8 (formed between the enlarged end portions 11 and the reduced end portions 12 of the openings 10) when said sections 2 and 3 are rotated relative to each other.

To facilitate movement of the rim section 3 with respect to the rim section 2, for purposes of mounting and dismounting same upon a pneumatic tire casing X, I provide a pair of opposed U-shaped handles 18 each of which spans the inner ends 14 of an adjacent pair of locking fingers 13 at diametrically opposite points on section 3. It should be clear that when internal expanding pressure is introduced into the casing X, through the medium of the valve stem equipped inner-tube Y therein, that such lateral pressure will be exerted between the grooved locking fingers 13 and the locking lugs 17 of the plate-like disc 8 to cause locking engagement between the rim sections 2 and 3 when the rim 1 is in use during a buffing, retreading operation or the like. In fact, the locking fingers 13 cannot be removed from the reduced end portions 12 of the openings 10, for the purpose of dismounting the tire X from the rim 1, until the air pressure within the tube Y has been released.

The circumferentially spaced openings 19 about the central opening 9 are adapted to receive clamping bolts upon a precision tire truing, buffing machine of the type illustrated in Patent 2,636,277, or the like.

My invention has been thoroughly tested and found to be completely satisfactory for the accomplishment of the above objects and while I have disclosed a commercial embodiment thereof I wish it to be understood that same is capable of modification without departure from the scope of the appended claim.

What I claim is:

A rim of the class described comprising, in combination, a pair of cooperating abutting cylindrical sections of equal diameter each having a generally radially outwardly projecting annular bead-engaging flange, one of said sections having a plurality of circumferentially equi-distantly spaced guide-acting locking fingers each disposed substantially parallel to the axis of the rim and projecting axially inwardly away from the flange on said one section and terminating in a free end portion having a transverse groove facing radially inwardly of said rim, the other of said sections having an annular plate-like disc projecting radially inwardly and disposed substantially normal to the axis of the rim, said disc having a plurality of circumferentially equi-distantly spaced openings, said openings each having enlarged and reduced end portions defining radially outwardly extending locking lugs, each of said openings being axially aligned with one of said fingers with the enlarged portion of each opening initially receiving the free end portion of the respective locking finger and providing for limited rotary movement of the rim sections relative to each other when said sections are assembled and disassembled, with each of the fingers engaging a portion of the radial inner surface of the other cylindrical section and with each groove receiving the locking lug of the respective opening when said sections are in cooperating rim-forming relationship, said one of said sections having an axial width considerably less than said other of said sections and said plate-like disc being located midway between the bead-engaging flanges when said sections are in cooperating rim-forming relationship.

References Cited in the file of this patent

UNITED STATES PATENTS

| | | |
|---|---|---|
| 2,480,578 | Hodges | Aug. 30, 1949 |
| 2,521,249 | Patterson | Sept. 5, 1950 |
| 2,646,315 | Richard | July 21, 1953 |

FOREIGN PATENTS

| | | |
|---|---|---|
| 920,765 | France | Jan. 4, 1947 |